June 2, 1964   L. GOTTFRIED ETAL   3,135,546
FRAME OF A CANOPY FOR A STROLLER OR THE LIKE
Filed Dec. 31, 1962

INVENTORS
LOUIS GOTTFRIED
JACOB BERGER

BY

ATTORNEY.

United States Patent Office 3,135,546
Patented June 2, 1964

3,135,546
FRAME OF A CANOPY FOR A STROLLER
OR THE LIKE
Louis Gottfried, 515 West End Ave., and Jacob Berger,
600 W. 246th St., both of New York, N.Y.
Filed Dec. 31, 1962, Ser. No. 248,362
2 Claims. (Cl. 296—102)

The present invention relates to a canopy, in general, and to a frame structure for such canopy, in particular.

It is known to provide a canopy in a stroller chair, which canopy is carried by a frame of U-shape, the free ends of which are secured in openings provided in the handle portion of a stroller, so that the frame and, thereby, the canopy, extends from the pusher portion of the stroller chair above the seat of the stroller, in order to protect a baby wheeled in the stroller from sand, wind, dirt and the like.

The frame used in conventional canopies has at its free ends a U-shaped end, one leg member of the U being inserted in openings of the tubular handle portion of the stroller. The other leg portion of the end U-formation of the frame for the canopy engages the top face of the handle portion of the stroller and, thereby, maintains the canopy in substantially horizontal position. It has been experienced, however, that wind and rain have a sufficient force to raise the canopy upwardly, since no resistance is provided against such upward movement, and upon occurrence of such upward movement of the canopy, the baby remains unprotected against rain, wind or the like.

It is, therefore, one object of the present invention to provide a frame for a canopy to be attached to a stroller or the like, which frame is equipped at its ends with means which not only prevent a downward movement of the canopy, but which prevent also an upward movement of the canopy, even if a stronger wind is exerted against the material forming the canopy.

It is another object of the present invention to provide a frame for a canopy of a stroller or the like, wherein the free end portions of the U-shaped frame have U-shaped formations, one leg member of which is inserted in corresponding lateral openings in the pusher handle of the stroller, while the other leg member engages the upper face of the tubular handle of the stroller, and wherein in addition, in accordance with the present invention, an L-shaped member is preferably welded to the inner face of the U-shaped formation. The L-shaped member, preferably welded to the U-shaped formation, engages the bottom face of the pusher handle and, thereby, preventing an upward movement of the frame of the canopy.

With these and other objects in view, which will become apparent in the following detailed description, the present invention will be clearly understood in connection with the accompanying drawing, in which.

Figure 1:
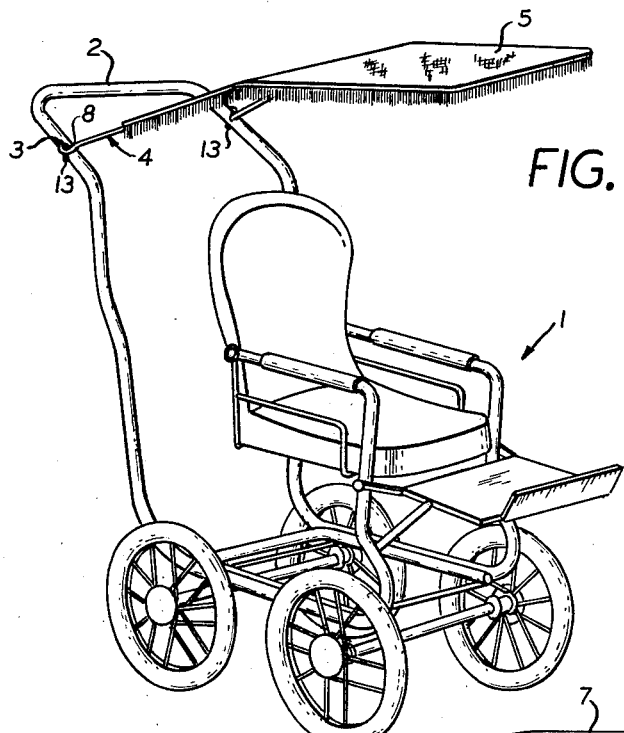
FIGURE 1 is a perspective side view of a stroller or carriage being equipped with a canopy.
Figure 2:
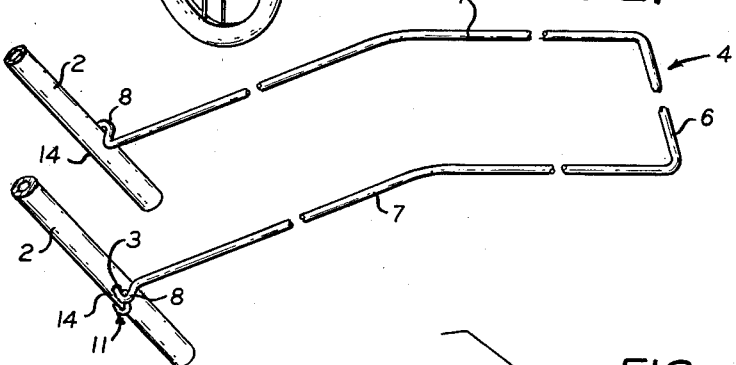
FIG. 2 is a perspective side view of the frame for the canopy shown at an enlarged scale.
Figure 3:
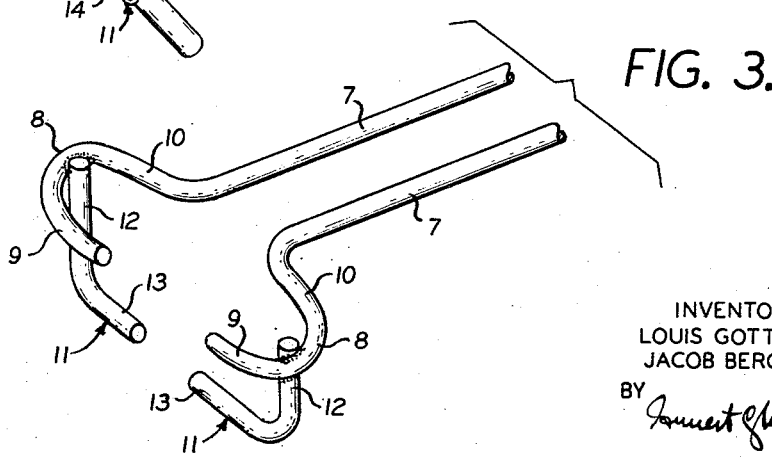
FIG. 3 is a fragmentary perspective view without the handle support of the frame for the canopy.

Referring now to the drawing, FIG. 1 discloses a stroller 1 having a pusher handle of tubular material in conventional manner, which pusher handle is equipped on the outside with lateral bores 3, which are adapted to receive the end portions of the U-shaped frame 4, on which a canopy 5 is mounted in known manner.

The frame 4 has a base 6 and two legs 7 disposed substantially parallel to each other. The end portions of the legs 7 at their free ends form small U-shaped ends by bending the ends of the legs 7 to such U-shaped formations 8. Such bending is possible, because the frame 4 is made, preferably, of a heavy wire having circular cross-section. The U-formation 8 provided at the free ends of the legs 7 has an outer leg portion 9 and an inner leg portion 10. The outer leg portion 9 is inserted into the bore 3 of the pusher handle 2, which is easily accomplished because the leg members 7 have the tendency to spring inwardly towards each other by the resiliency of the wire, so that upon insertion of the outer leg portions 9 into the bore 3, the frame will remain in this position. The inner leg portion of the U-formation 8 engages the top face of the pusher handle 2 and, thus, creates a limit or abutment or a downward movement of the frame 4 and, thereby, of the canopy 5.

In order to provide an abutment means for movement of the frame 4 in upward direction, which can be caused by wind, rain, or the like, pressing against the bottom face of the canopy 5, the U-formation 8 has, preferably welded thereto, an L-shaped member 11 which has a vertical leg 12 and a horizontal leg 13. The vertical leg 12 is welded at its free end between the outer leg 9 and the inner leg 10 of the U-formation, while the horizontal leg 13 is directed inwardly to engage the bottom face 14 of the pusher handle 2.

By such arrangement, the frame 4 is prevented from performing a downward movement and due to the horizontal leg portion 13, is also prevented to perform an upward movement in case of pressure exerted upon the canopy 5 due to wind, rain or the like.

While we have disclosed one embodiment of the present invention, it is to be understood that this embodiment is given by example only and not in a limiting sense, the scope of the present invention being determined by the objects and the claims.

We claim:

1. A frame for a canopy of a stroller or the like having a tubular pusher handle, comprising a U-shaped member of wire having a base and two legs projecting substantially perpendicularly from said base and tending resiliently towards each other, each of said legs having at its free end an integral U-shaped formation disposed crosswise to the longitudinal direction of said leg, said U-shaped formation including an outer leg portion, adapted to be received in a lateral bore of said tubular pusher handle, and an inner leg portion adapted to engage the upper face of said tubular pusher handle in order to retain said frame in substantially horizontal position, and means secured to and projecting from said U-shaped formation disposed at the rear end of said U-shaped member and engaging the bottom face of said tubular pusher handle, in order to prevent an upward movement of said frame.

2. A frame for a canopy of a stroller or the like having a tubular pusher handle, comprising a U-shaped member of wire having a base and two legs projecting substantially perpendicularly from said base and tending resiliently towards each other, each of said legs having at its free end an integral U-shaped formation disposed crosswise to the longitudinal direction of said leg, said U-shaped formation including an outer leg portion, adapted to be received in a lateral bore of said tubular pusher handle, and an inner leg portion adapted to engage the upper face of said tubular pusher handle in order to retain said frame in substantially horizorntal position, and means secured to and projecting from said U-shaped formation disposed at the rear end of said U-shaped member and engaging the bottom face of said tubular pusher handle, in order to prevent an upward movement of said frame, said means secured to and projecting from said U-shaped formation comprises
a substantially L-shaped member comprising a substantially vertical portion and a substantially horizontal portion,
said substantially vertical portion being rigidly secured to at its free end and disposed between said outer leg portion and said inner leg portion of said U-shaped formation, and
said substantially horizontal portion engaging the bottom face of said tubular pusher handle in order to prevent an upward movement of said frame.

References Cited in the file of this patent
UNITED STATES PATENTS

| | | |
|---|---|---|
| 2,904,237 | Wasyluk | Sept. 15, 1959 |
| 2,982,562 | Gladstein | May 2, 1961 |